United States Patent
Rockwell et al.

(10) Patent No.: US 8,051,477 B2
(45) Date of Patent: Nov. 1, 2011

(54) SECURITY STATE VECTOR FOR MOBILE NETWORK PLATFORM

(75) Inventors: Laurence I. Rockwell, Redmond, WA (US); Timothy M. Aldrich, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 1351 days.

(21) Appl. No.: 11/003,994

(22) Filed: Dec. 3, 2004

(65) Prior Publication Data

US 2005/0254654 A1 Nov. 17, 2005

Related U.S. Application Data

(60) Provisional application No. 60/563,740, filed on Apr. 19, 2004.

(51) Int. Cl.
*G06F 11/00* (2006.01)
*G06F 12/14* (2006.01)
*G06F 12/16* (2006.01)
*G08B 23/00* (2006.01)

(52) U.S. Cl. ............ 726/22; 726/11; 713/151; 713/168; 380/270; 709/224

(58) Field of Classification Search ...................... 726/22
See application file for complete search history.

(56) References Cited

U.S. PATENT DOCUMENTS

| 6,408,391 | B1 * | 6/2002 | Huff et al. ........................ 726/22 |
| 7,039,953 | B2 * | 5/2006 | Black et al. ...................... 726/14 |
| 7,127,743 | B1 * | 10/2006 | Khanolkar et al. ............... 726/23 |
| 7,219,239 | B1 * | 5/2007 | Njemanze et al. ................. 726/3 |
| 7,360,217 | B2 * | 4/2008 | Melvin et al. .................. 718/102 |
| 7,363,656 | B2 * | 4/2008 | Weber et al. ..................... 726/23 |
| 2003/0027550 | A1 | 2/2003 | Rockwell |
| 2003/0027551 | A1 * | 2/2003 | Rockwell ....................... 455/410 |
| 2004/0137915 | A1 * | 7/2004 | Diener et al. .............. 455/456.1 |

FOREIGN PATENT DOCUMENTS

JP 2000293387 * 10/2000

* cited by examiner

*Primary Examiner* — Eleni Shiferaw
*Assistant Examiner* — Shewaye Gelagay
(74) *Attorney, Agent, or Firm* — Toler Law Group

(57) ABSTRACT

State of security in a mobile communications network is communicated. Data regarding nature and severity of security events onboard at least one mobile platform is generated and processed. A message that includes the processed data is generated and transmitted periodically. The processed data makes up a security state vector that includes the number of security events detected since power-up of the mobile platform node, sum of highest severity security events since power-up or counter rollover, sum of the second highest severity security events detected since power-up or counter rollover, sum of the third highest severity security events detected since power-up or counter rollover, highest security event classification, second-highest security event classification, and third-highest security event classification. The processed data may be used in a network operations center to prioritize mobile platforms from which logged data should be retrieved for further investigation and monitoring.

20 Claims, 16 Drawing Sheets

| 72 | 73 | 74 | 75 | 76 | 77 | 78 |
|---|---|---|---|---|---|---|
| TOTAL NUMBER OF DETECTED EVENTS SINCE SERVER INITIALIZATION | MOST CRITICAL EVENT CLASSIFICATION OF LAST n EVENTS | SECOND MOST CRITICAL EVENT CLASSIFICATION OF LAST n EVENTS | THIRD MOST CRITICAL EVENT CLASSIFICATION OF LAST n EVENTS | NUMBER OF CRITICAL EVENTS SINCE COUNTER ROLLOVER OR SERVER INITIALIZATION | NUMBER OF MAJOR EVENTS SINCE COUNTER ROLLOVER OR SERVER INITIALIZATION | NUMBER OF MINOR EVENTS SINCE COUNTER ROLLOVER OR SERVER INITIALIZATION |
| 16 BITS | 8 BITS | 8 BITS | 8 BITS | 8 BITS | 8 BITS | 8 BITS |

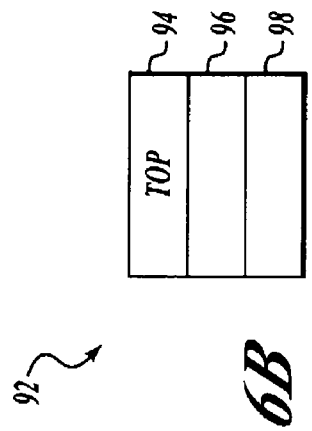
*FIG. 6B*
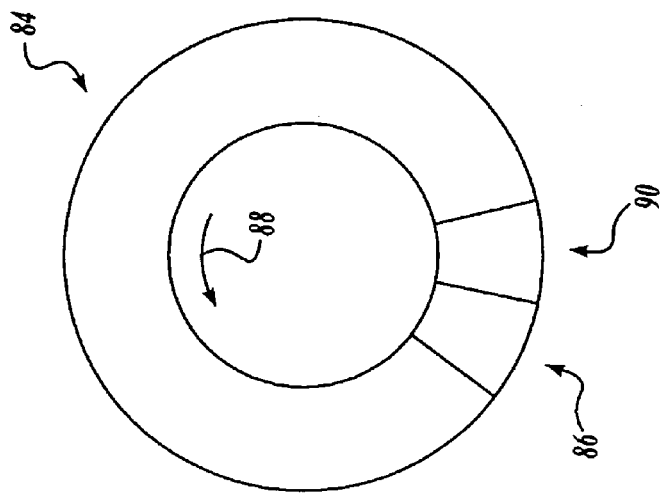
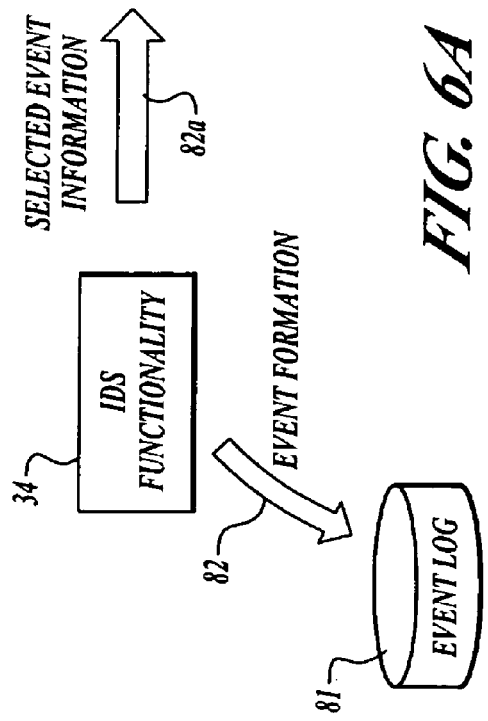
*FIG. 6A*

SECURITY STATE VECTOR FOR MOBILE NETWORK PLATFORM

CROSS-REFERENCE TO RELATED APPLICATIONS

This Application is a Non-Prov of Prov (35 USC 119(e)) application 60/563,740 filed on Apr. 19, 2004.

BACKGROUND OF THE INVENTION

Information is often exchanged and entertainment content is often broadcast as packetized data over communication networks. Typically, an end user accesses information or entertainment content via a user terminal such as a desktop computer, a laptop computer, a personal digital assistant (PDA), and Internet-enabled mobile phone, or the like. The user terminals may be connected to the network via wireless radiofrequency (RF) connectivity or, with the exception of a mobile phone, via a cable or Ethernet connection. Further, the network typically includes routers and switches for routing the data packets from content providers or other network destinations to the end user through networks, such as the Internet.

Organizations and enterprises are becoming more and more dependent upon such networks for day-to-day operations. Further, a significant number of organizations, such as Connexion by Boeing™, are in the business of providing such networks for end users. Because of the importance of maintaining network operations to organizations and to end-users/customers, network management tools have been developed to monitor network operations and status.

Conventional network security management systems are designed to operate in terrestrial environments that have very large bandwidth (~100 mbps-1000 mbps). Network security management systems receive inputs from a variety of sources, including intrusion detection systems. These intrusion detection systems provide detected security events, such as attempted login, in a verbose format which can be stored on local disk or transmitted via simple network management protocol (SNMP) to a network security management system.

However, a node may be a mobile platform such as an airplane, a maritime vessel, a land vehicle, or the like. In such a network, the mobile network communication link is a scarce resource. Network Operational Center (NOC) personnel's time is also a scare resource. The communication resources available to a satellite based mobile network utilizing shared satellite transponder resources are much more modest (~56 kbps-128 kbps) than those resources that are available to a fixed-location terrestrial-based network. Most of this satellite communication link resource must be available for the primary use of paying customer traffic.

It would therefore be desirable to provide current and accurate knowledge to terrestrial NOC operators of the security state of each mobile platform while utilizing a minimum amount of the critical communication resource.

SUMMARY OF THE INVENTION

Embodiments of the present invention provide a method and system for managing security of a mobile communications network. According to the present invention, security of a mobile communication network node is managed by providing current and accurate knowledge to terrestrial NOC operators of the security state of each mobile platform in the mobile communications network while utilizing a minimum amount of bandwidth of the communication link. As a result, operators may focus their efforts on the more severe security issues that may exist within the mobile communications network, thereby permitting security "triage" measures to be performed.

According to an embodiment of the present invention, state of security in a mobile communications network is communicated. Data is generated regarding severity of a plurality of security events onboard at least one mobile platform in a mobile communications network, and the data is processed. A message that includes the processed data is generated, and the message is transmitted periodically. According to aspects of the present invention, the processed data makes up a security state vector that includes the number of security events detected since power-up of the mobile platform node, the sum of highest severity security events since power-up or counter rollover, the sum of the second highest severity security events detected since power-up or counter rollover, the sum of the third highest severity security events detected since power-up or counter rollover, and the highest security event classification, the second-highest security event classification, and the third-highest security event classification. Upon reception of the message, an event is created within a network security management system, and security status is displayed. A security status indicator is derived from the highest of reported event classification value in the security state vector, and an updated security status indicator event is sent to a network management system. Raw mobile platform security events may be accessed or cleared, if desired. If raw mobile platform security events are accessed, events are issued in the network security management system for every intrusion detection event logged.

According to an aspect of the present invention, generating security state vector elements includes summing the security events by severity as they are received, storing the events in a buffer and then determining the highest, second highest, and third highest security event classifications in the buffer. Advantageously, the security state vector characterizes the three most-recently-recorded security intrusion event classifications having the highest severity over a previous predetermined period of time—yet consumes a negligible portion of total available bandwidth. In one present embodiment, the security state vector consumes no more than around 0.000372% of total available bandwidth.

According to another aspect of the present invention, clearing the raw mobile platform security events may include resetting a mobile security status indicator, clearing all events associated with the mobile platform prior to a current time, and sending a clear mobile platform security status event to the network management system.

Further, the number, frequency, and classification of security events may be used to make an operational decision to retrieve logs from the mobile network element at the cost of removing important communication link assets (that is, bandwidth) from paying customer use. If the security event is considered operationally severe, the security event logs may be retrieved from the mobile network element.

Advantageously, network security management may be optimized based on operationally-determined parameters to automatically retrieve and display security event logs as the mobile network scales to even larger sizes. Thus, security management may be scaled without becoming cost prohibitive.

BRIEF DESCRIPTION OF THE DRAWINGS

FIG. 5 illustrates an exemplary security state vector reporting format according to the architecture of FIG. 4;

FIGS. 6A and 6B illustrate details of producing an exemplary security state vector;

DETAILED DESCRIPTION OF THE INVENTION

Embodiments of the present invention provide a method and system for managing security of a mobile communications network. According to the present invention, security of a mobile communication network node is managed by providing current and accurate knowledge to terrestrial NOC operators of the security state of each mobile platform in the mobile communications network while utilizing a minimal amount of bandwidth of the communication link. As a result, operators may focus their efforts on the more severe security issues that may exist within the mobile communications network, thereby permitting security "triage" measures to be performed.

By way of overview and according to an embodiment of the present invention, state of security in a mobile communications network is communicated. Data is generated regarding severity of a plurality of security events onboard at least one mobile platform in a mobile communications network, and the data is processed. A message that includes the processed data is generated, and the message is transmitted periodically. The processed data makes up a security state vector that includes the number of security events detected since power-up of the mobile platform node, the sum of highest severity security events since power-up or counter rollover, the sum of the second highest severity security events detected since power-up or counter rollover, the sum of the third highest severity security events detected since power-up or counter rollover, and the highest security event classification, the second-highest security event classification, and the third-highest security event classification.

An exemplary mobile network that includes an exemplary system for managing security of the mobile network will first be explained by way of non-limiting example. Next, an overview of management of security of a mobile platform within the mobile network will be explained. Finally, an exemplary method for managing security of the mobile network will be set forth.

Exemplary Mobile Network

Figure 1:
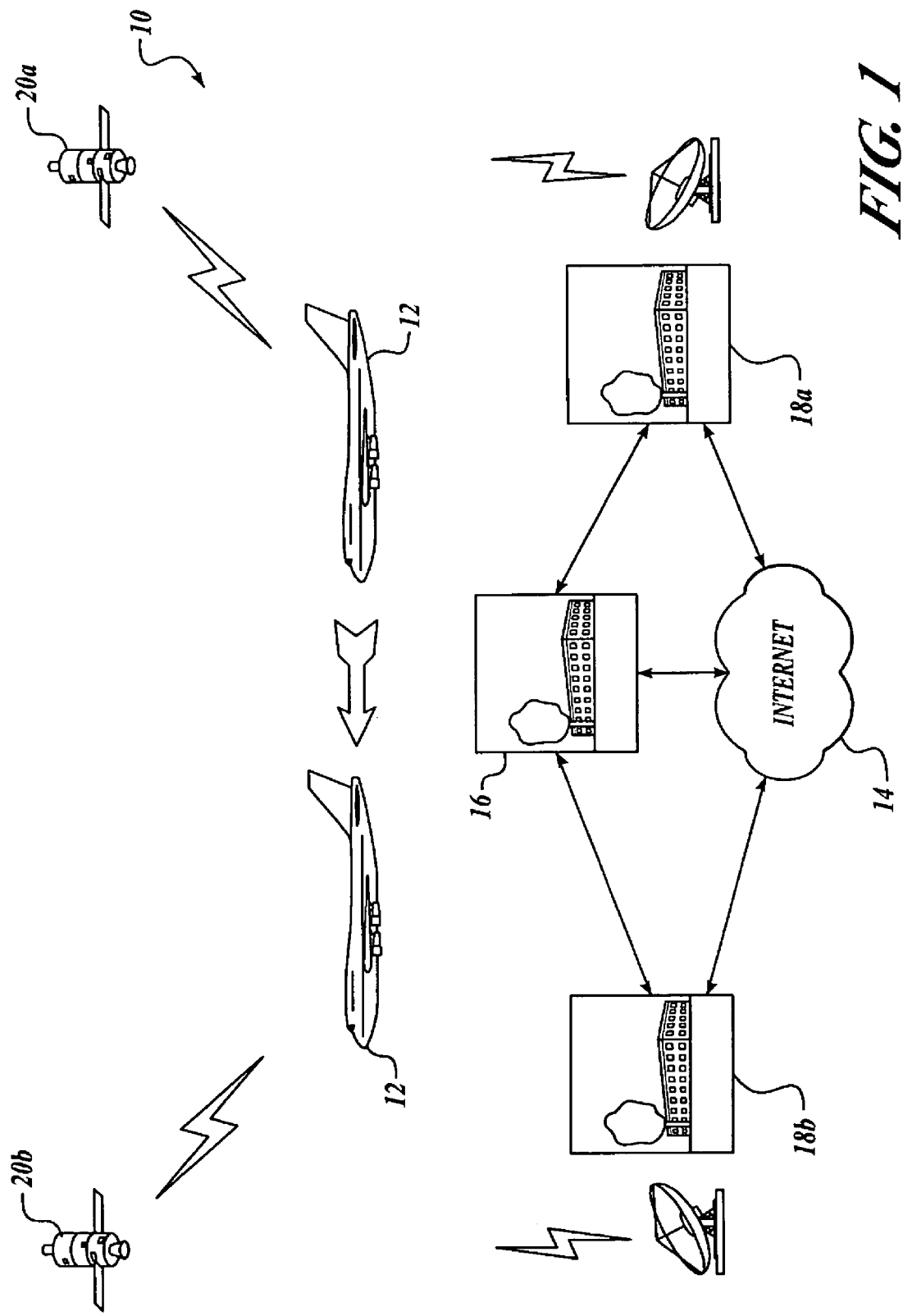
FIG. 1 is a block diagram of an exemplary mobile communications network.

Referring now to FIG. 1 and given by way of non-limiting example, an exemplary mobile communications network 10 provides communications between a mobile platform 12 and destinations connected to a network 14, such as the Internet. The mobile platform 12 may be any mobile platform as desired, such as without limitation an airplane, a maritime vessel, a land vehicle, or the like. While the mobile platform 12 is illustrated herein by way of non-limiting example, it is to be understood that such a representation is not intended to limit the mobile platform 12 to an airplane.

A network operation center (NOC) 16 is in digital packet communication with the mobile communications network 10. Ground stations 18a and 18b are in digital packet communication with the network operation center 16 and the Internet 14. The ground stations 18a and 18b are in radiofrequency (RF) communication with satellites 20a and 20b, respectively, such as without limitation Ku or Ka band geostationary satellites, that each have their own area of RF coverage. The mobile platform 12 is in RF communication with the satellite 20a when the mobile platform 12 is within the area of RF coverage of the satellite 20a. The mobile platform 12 is in RF communication with the satellite 20b when the mobile platform 12 is within the area of RF coverage of the satellite 20b. RF transmissions from the ground stations 18a and 18b to the satellites 20a and 20b, respectively, and from the satellites 20a and 20b to the mobile platform 12 are referred to as a forward link. RF transmissions from the mobile platform 12 to the satellites 20a and 20b and from the satellites 20a and 20b to the ground stations 18a and 18b, respectively, are referred to as a return link. Given by way of non-limiting example, the forward link may have a data rate (sometimes referred to as bandwidth) of around 5 Mbits/second (Mbps) and the return link may have a data rate of around 128 Kbps, sharing the communication link with other mobile platforms. If desired, entertainment content can be provided to the mobile platform 12 via the forward link.

Given by way of non-limiting example, an exemplary mobile communications network 10 that is well-suited for implementing embodiments of the present invention is Connexion by Boeing. Details regarding Connexion by Boeing are set forth in U.S. patent application Ser. No. 6b 09/989,742 published as U.S. patent application publication no. 2002/008792, the contents of which are hereby incorporated by reference. It will be appreciated that RF connectivity may be established via cellular RF communications directly between the mobile platform 12 and the ground stations 18a and 18b instead of satellite RF communications, if desired.

Figure 2:
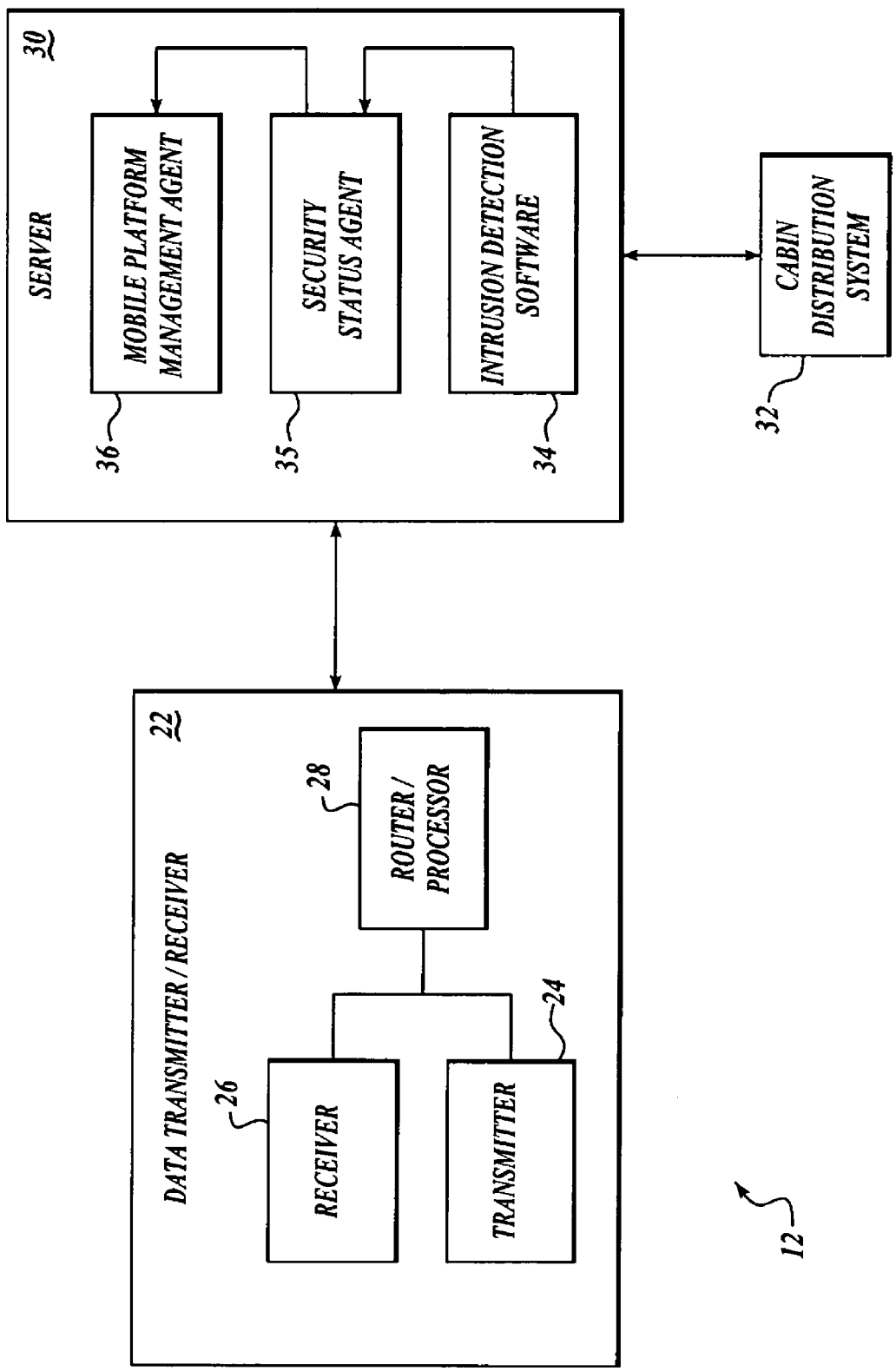
FIG. 2 is a block diagram showing details of a mobile platform that is part of the network of FIG. 1.

Referring now to FIG. 2, details will now be set forth regarding the mobile platform 12. The mobile platform 12 includes a data transmitter/receiver (DTR) 22. The DTR 22 includes a transmitter 24 and a receiver 26. The transmitter 24 and the receiver 26 are any suitable transmitter and receiver known in the art for transmitting and receiving Ka band or Ku band RF communications, or RF communications in frequency bands assigned to cellular or G3 communications, as desired. The transmitter 24 and the receiver 26 may be standalone components or may be provided as a transceiver, as desired for a particular application. The transmitter 24 and the receiver 26 are both in signal communication with suitable transmit and receive antennas (not shown) or a suitable antenna with transmit and receive apertures, as desired. The antenna(s) may be any suitable phased array antenna or mechanical antenna known in the art as desired for a particular application.

The transmitter 24 and the receiver 26 are in digital packet communication with a router/processor 28. The router/processor 28 is any suitable router known in the art.

A server 30 is in digital packet communication with the router/processor 28. The server 30 is any suitable server known in the art. The server 30 distributes digital data packets to and from a distribution system 32 within a cabin (not shown) of the mobile platform. User terminals (not shown) such as laptop computers, personal digital assistants, cellular phones, or the like, or cabin displays and loudspeakers, as desired, are in wired or wireless packet communication with the server 30 via the cabin distribution system 32.

The components of the mobile platform as set forth above are known in the art, and a detailed discussion of their construction and operation is not necessary for an understanding of the invention. Nonetheless, further details of an exemplary DTR 22, server 30, and cabin distribution system 32 are set forth in U.S. patent application Ser. No. 09/639,912 filed Aug. 16, 2000 for "Method and Apparatus for Providing Television and Data Services to Mobile Platforms" and assigned to The Boeing Company, the contents of which are hereby incorporated by reference.

According to an embodiment of the present invention, the server 30 includes intrusion detection software (IDS) functionality 34. The IDS functionality 34 suitably is implemented in software that resides on the server 30. The IDS software suitably is any acceptable open source or commercial-off-the-shelf IDS software. The IDS functionality monitors for security events, such as an attempt to gain root access to the server 30 by an attempted buffer overflow of the server 30 by any of the user terminals connected within the cabin distribution system 32, an attempted information leak through exploiting vulnerabilities in web server scripts, or the like.

The IDS functionality 34 communicates with a security status agent 35 that is resident on the server 30. The security status agent 35 collects and stores security event information. The security status agent 35 formats the security state vector and sends it to a mobile platform management agent 36. The mobile platform management agent 36 is resident on the server 30. The mobile platform management agent 36 receives security status information from the security status agent 35 and places the security state vector information in a pre-formatted status message (discussed below). The mobile platform management agent 36 then causes the server 30 to communicate the security status message to the DTR 22 for transmission. The mobile platform management agent 36 also receives commands (discussed below) from the network operation center 16 to poll the server 30 for IDS logs resident on the server 30.

Figure 3:
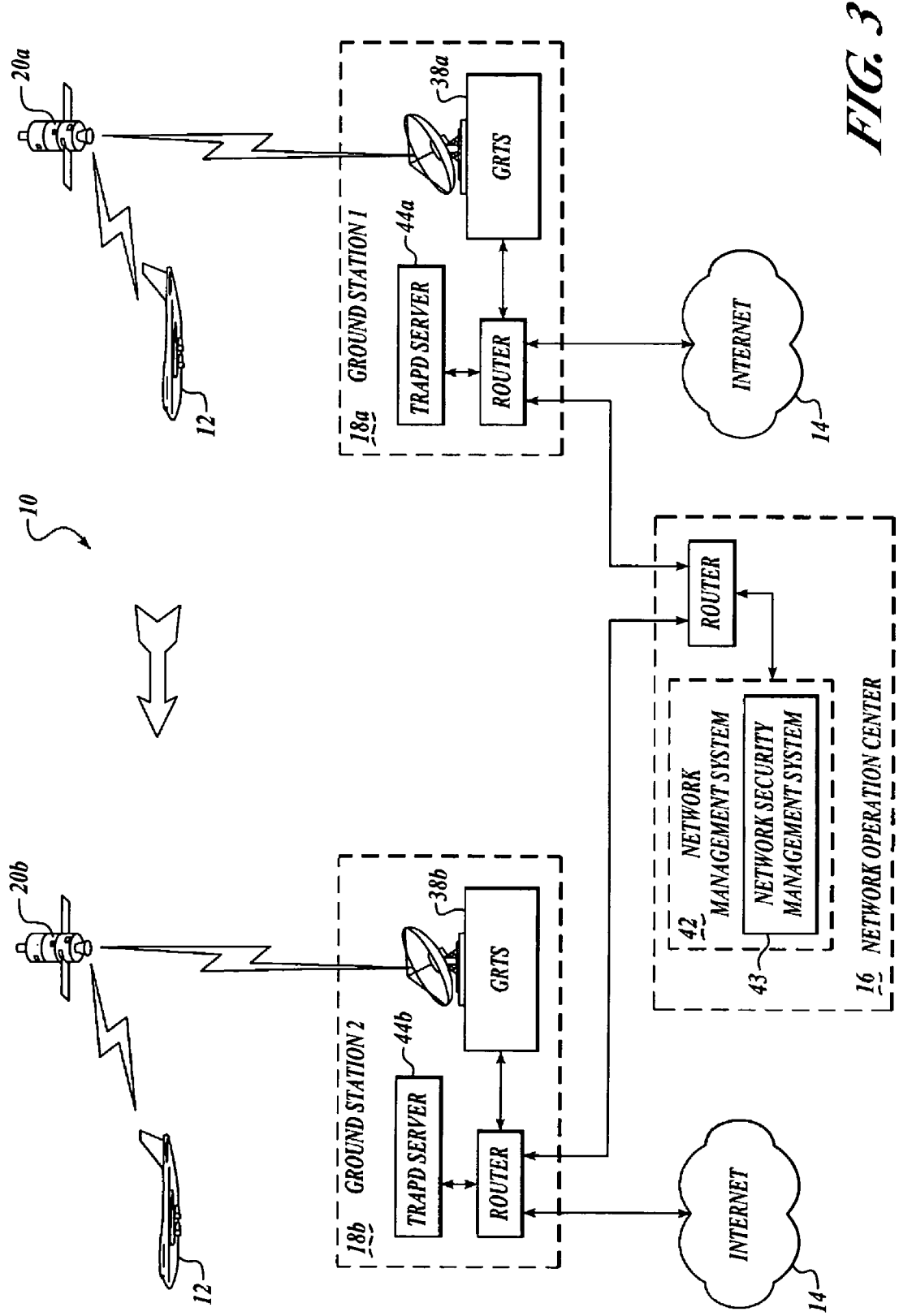
FIG. 3 is a block diagram showing details of the network of FIG. 1.

Referring now to FIG. 3, details of the network operation center 16 and the ground stations 18a and 18b will now be discussed. Ground receive transmit system (GRTS) communications devices 38a and 38b within the ground stations 18a and 18b, respectively, are in packet signal communication with the Internet 14 via one or more routers. The GRTS communications devices 38a and 38b are also in packet signal communication with message servers 44a and 44b, respectively, within the ground stations 18a and 18b, respectively, and the network management system 42 within the network operation center 16. The GRTS communications devices 38a and 38b are in RF communication with the satellites 20a and 20b, respectively.

Figure 3A:
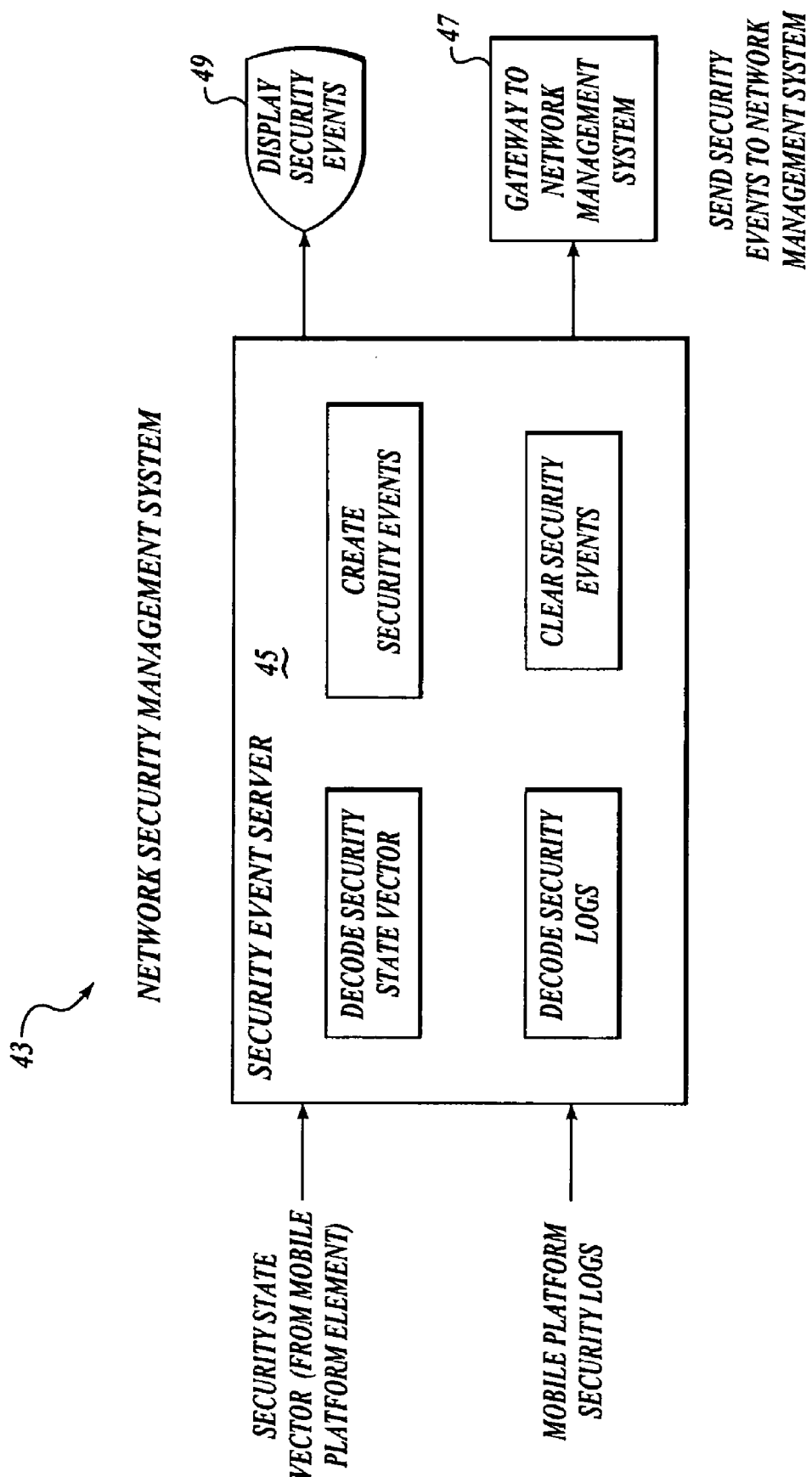
FIG. 3A shows details of a network security management system.

The network operation center 16 includes a network management system 42. The network management system 42 includes a network security management system 43. Referring briefly to FIG. 3A, the network security management system 43 is responsible for displaying, tracking, and disposition of all security events within the mobile communications network 10. The network security management system 43 includes a security event server 45 that receives the security state vector from the mobile platform 12. The security event server 45 decodes the security state vector, and creates security events. When desired, the security event server 45 clears security events. The security event server 45 sends security events to the network management system 42 via a gateway 47. A display device 49 displays the security events.

The security event server 45 also receives mobile platform security logs. The security event server 45 decodes the security logs and creates security events.

Referring back to FIG. 3, the network management system 42 is informed by the GRTS communications devices 38a and 38b whether or not the mobile platforms 12 have established connectivity with the ground stations 18a or 18b.

A message server 44a within the ground station 18a is in packet communication with the GRTS communications device 38a, and a message server 44b within the ground station 18b is in packet communication with the GRTS communications device 38b. The message servers 44a and 44b are in packet communication with the network management system 42.

As will be discussed below, the message servers 44a and 44b receive packetized data messages regarding security status of the mobile platform 12 from the mobile platform 12 via the satellites 20a and 20b and the GRTS communications devices 38a and 38b, respectively, and communicate the packetized data messages to the network management system 42 and the network security management system 43. As will also be discussed below, the network management system 42 analyzes the packetized data messages and generates an appropriate display for information contained within the packetized data messages. The network management system 42 also interrogates the GRTS communications devices 38a and 38b for connectivity information of the mobile platform 12.

Now that details regarding the mobile communications network 10 have been set forth, an explanation of an exemplary architecture for management of security of the mobile platform 12 will be discussed.

Exemplary Architecture for Mobile Platform Security Management

Figure 4:
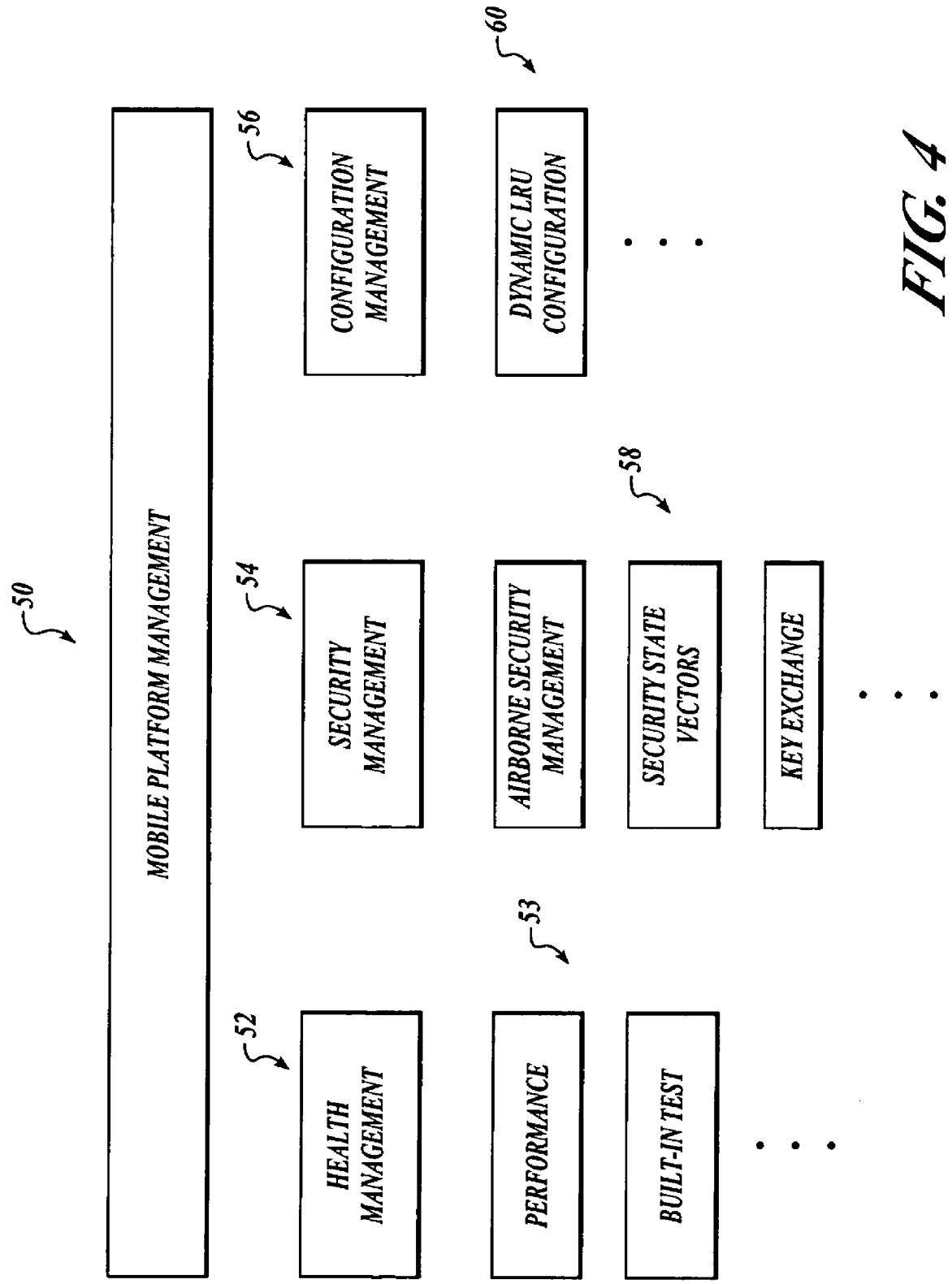
FIG. 4 illustrates a top level architecture of mobile platform management.

Referring now to FIG. 4, an exemplary architecture 50, given by way of non-limiting example, establishes a management structure for the mobile platform 12. The architecture 50 includes without limitation a management object 52 for health management of the mobile platform 12, a management object 54 for security management of the mobile platform 12, and a management object 56 for configuration management of the mobile platform 12. It will be appreciated that the management objects 52, 54, and 56 are given by way of non-limiting example and that other management objects may be established as desired for a particular application.

The management object 52 for health management of the mobile platform 12 may include sub-objects 53 as desired for managing health aspects of the mobile platform 12. The sub-objects 53 include without limitation performance, built-in test, and the like, as desired. Health management of the mobile platform 12 is discussed in U.S. Pat. No. 7,328,011, the contents of which are hereby incorporated by reference.

The management object 56 for configuration management of the mobile platform 12 may include sub-objects 60 as desired for managing configuration aspects of the mobile platform 12, such as without limitation dynamic configuration of line replaceable units (LRUs), and the like. Configuration management of the mobile platform 12 is discussed in pending U.S. patent application Ser. No. 10/973,727 filed Oct. 26, 2004 for "Dynamic Configuration Management" and assigned to The Boeing Company, the contents of which are hereby incorporated by reference.

The management object 54 for security management of the mobile platform 12 may include sub-objects 58 as desired for managing security aspects of the mobile platform 12, such as without limitation airborne security management, security state vectors, key exchange, and the like. Security management of the mobile platform 12 is discussed in U.S. Pat. No. 7,715,819 and U.S. Pat. No. 6,947,726, the contents of both of which are hereby incorporated by reference. Security state vector generation and management of the mobile platform 12 is discussed below.

Referring now to FIG. 5, a message 70 includes data that contains information regarding the security state vectors as prescribed by the sub-objects 58 (FIG. 4). Briefly, when a security event is detected by the IDS functionality 34 (FIG. 2), the IDS functionality 34 assigns a priority to the detected event, classifies the event, writes the detected event to a log, and makes the event data available to the security status agent 35 (FIG. 2). The security status agent 35 formats the security state vector—that is, the message 70. The message 70 is a security state vector that characterizes the three highest severity and unique security intrusion event classifications recorded over the previous recent time period. Advantageously, according to embodiments of the present invention, the security state vector consumes a negligible portion of total available bandwidth.

The message 70 advantageously is a packetized digital data message that includes in a field 72 the total number of security events detected by the IDS functionality 34 since startup. In one embodiment, this suitably is an unsigned 16 bit integer.

The security state vector message 70 also includes fields 73, 74, 75, 76, 77, and 78. In one embodiment, this suitably is a composite value including six 8-bit unsigned values characterizing the three highest-detected severity classification events and rollover counters for the numbers of critical security events, major security events, and minor security events detected since system initialization or counter rollover. The unsigned integers are initialized to zero on every reboot.

Referring now to FIGS. 5, 6A, and 6B, the security state vector is generated as follows. The IDS functionality 34 detects a security event, assigns a priority, assigns an event classification, and writes event information 82 to a log 81. In one exemplary embodiment, the event information 82 suitably includes the event string, the source and destination IP address, the source and destination MAC address, a time-tag, the event severity, and the event classification. The event string is a short description of the detected security event; the event classification is the type of detected event (e.g., denial of service, buffer overflow, information leakage, attempted root access, and the like); and event priority is a numerical measure of the seriousness of the event (such as warning, minor, major, critical, and the like). In other embodiments, any of the examples of components of the event information 82 may be included or omitted as desired for a particular application.

Selected event information 82a is written to a temporary storage buffer 84 on the server 30. In one exemplary embodiment, the buffer 84 suitably is a ring buffer. However, it is not necessary that the buffer 84 be a ring buffer. Any suitable memory storage structure may be used as desired, such as without limitation a time-tagged linked list or the like. The event information is written into an insertion point 86. The event information is stored in the buffer 84 in the order as shown by an arrow 88 such that the oldest record written into the buffer 84 resides at a point 90. With each write to the buffer 84, the insertion point 86 and oldest record 90 are updated. Suitable care is taken to recognize the transition from one end of the buffer 84 to the other end.

After writing to the buffer 84, a "top three stack" 92 is generated. The top three stack 92 includes records of security event information 94, 96, and 98 for the most-current and unique highest, next-highest, and third-highest events, respectively, in terms of classification and severity that have been recorded in the buffer 84 within a recent predetermined time period, such as without limitation around the last ten minutes or so.

In one exemplary embodiment, the top three stack 92 is generated by an exemplary routine as set forth below:
When walking through the ring buffer 84,
If severity>topThree[k].severity
Then
   Add current (classification, severity, time-tag) to topThree stack;
Else if severity=topThree[k].severity
  Then
    If Ring Buffer.EventClass Not Equal topThree[k].class
    Then
      Go to the next Lower position on the stack (if still room)
      And add current (classification, severity) to the topThree stack;
    Otherwise drop it since one is already on the stack;
Else if severity<topThree[k].severity
  Then repeat the above process for the next lower "position" k on the Ring Buffer.

It will be noted that the effect of the exemplary routine set forth above is that the three most current, unique, and highest (classification severity) pairs end up on the top three stack 92. It will be appreciated that less current, duplicate, and lower severity classifications get pushed off the "bottom" of the stack.

The three most current, unique, and highest classification values are then written into the fields 73, 74, and 75. Additionally, the fields 76, 77, and 78 contain counters of the number of critical, major, and minor events, respectively, detected since server initialization or counter rollover.

The log 81 is rotated periodically, such as without limitation around once per hour. However, it will be appreciated that the log 81 can be rotated as desired for a particular application. Otherwise, the log 81 is rotated when full. In one exemplary embodiment, the log 81 is rotated using Linux Log Rotate capability. Upon completion of log rotation, the log 81 is moved to a suitable directory in the server 30 for download and access by the network security management system 43.

Figure 7:
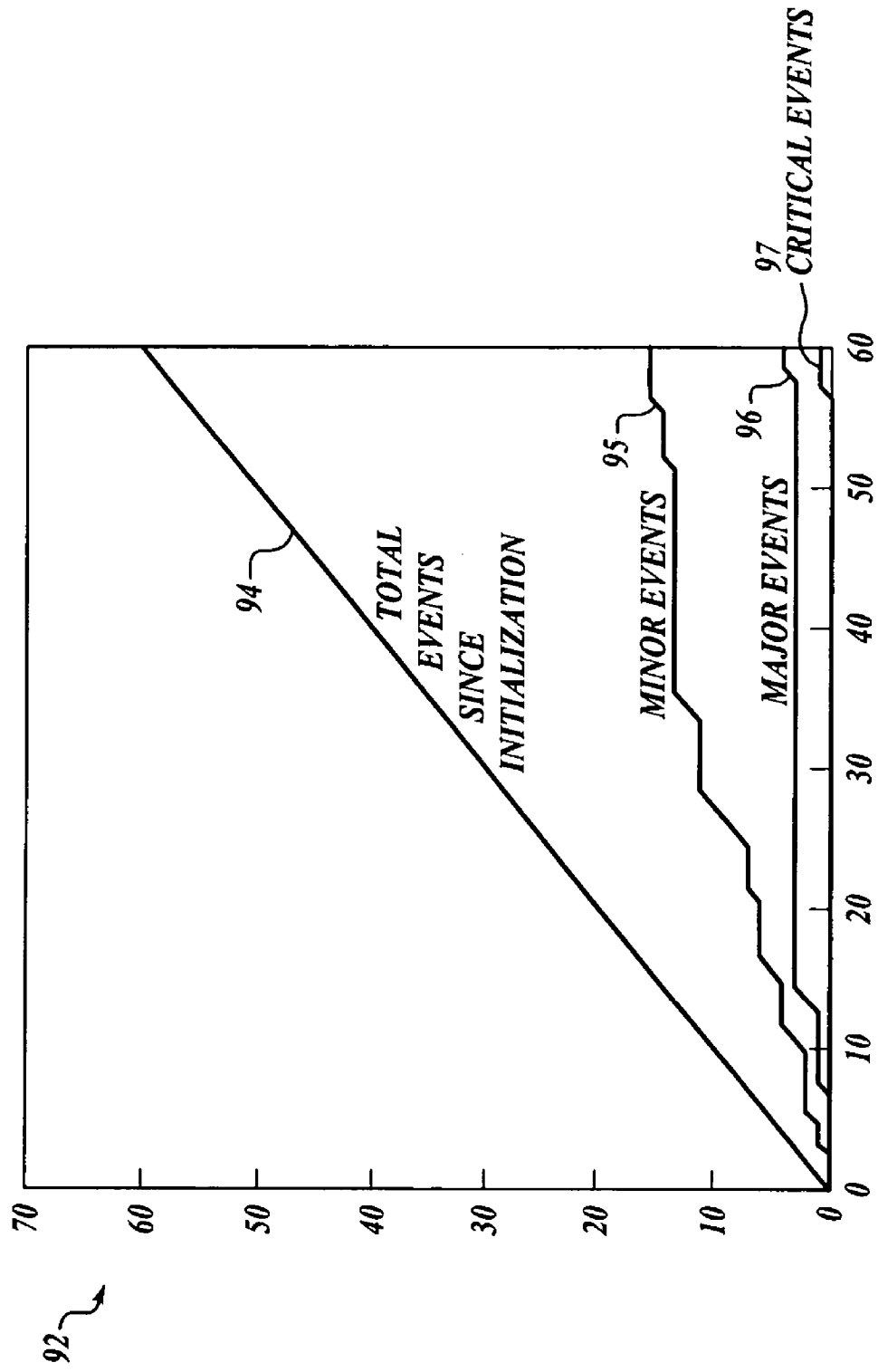
FIG. 7 illustrates a time history of exemplary security state vector elements.

Referring now to FIG. 7, a graph 92 illustrates a relationship between elements of the security state vector. A line 94 plots an exemplary rendering of total number of detected events since server initialization over time. A line 95 plots the number of minor events over time. A line 96 plots the number of major events over time. A line 97 plots the number of critical events over time. As security events are detected over time, the lines are extended. It will be appreciated that the number of warning events need not be transmitted. This value can be derived from the following relationship: Number of warning events=Total number of events detected since server initialization minus critical events minus major events minus minor events with suitable care to account for counter rollover.

Because the values are quantitative, processing filters can automatically detect and report to an operator the more severe attacks. This property is illustrated in the exemplary rendering illustrated in FIG. 7. This property advantageously permits the lines 96 and 97 to stand out and signal to an analyst or operator that an event or a number of events of a sufficient severity have occurred and should be investigated.

Figure 8:
FIG. 8 illustrates an exemplary security state display object.

Referring now to FIG. 8, an exemplary display object 102 may be seen by an operator or analyst at the network operation center 16 (FIGS. 1 and 3). The display object 102 displays a mobile platform identification number 104, an identifier 106 that delineates which ground station is currently connected to the mobile platform, and an indicator 108 that shows the number of users currently logged in. The display object 102 uses a color code to indicate security status. For example, industry standard severity indicators may be used. Exemplary color codes with mappings and significance of industry standard severity indicators are shown in Table 1 below by way of non-limiting example:

TABLE 1

| Value | Severity | Color |
|---|---|---|
| 0 | Clear | Green |
| 1 | Indeterminate | Purple |
| 2 | Warning | Blue |
| 3 | Minor | Yellow |
| 4 | Major | Orange |
| 5 | Critical | Red |

It will be appreciated that indeterminate (severity=1) codes suitably are used for informational alerts and for "undecipherable/un-pareseable/unknown" messages.

Figure 9:
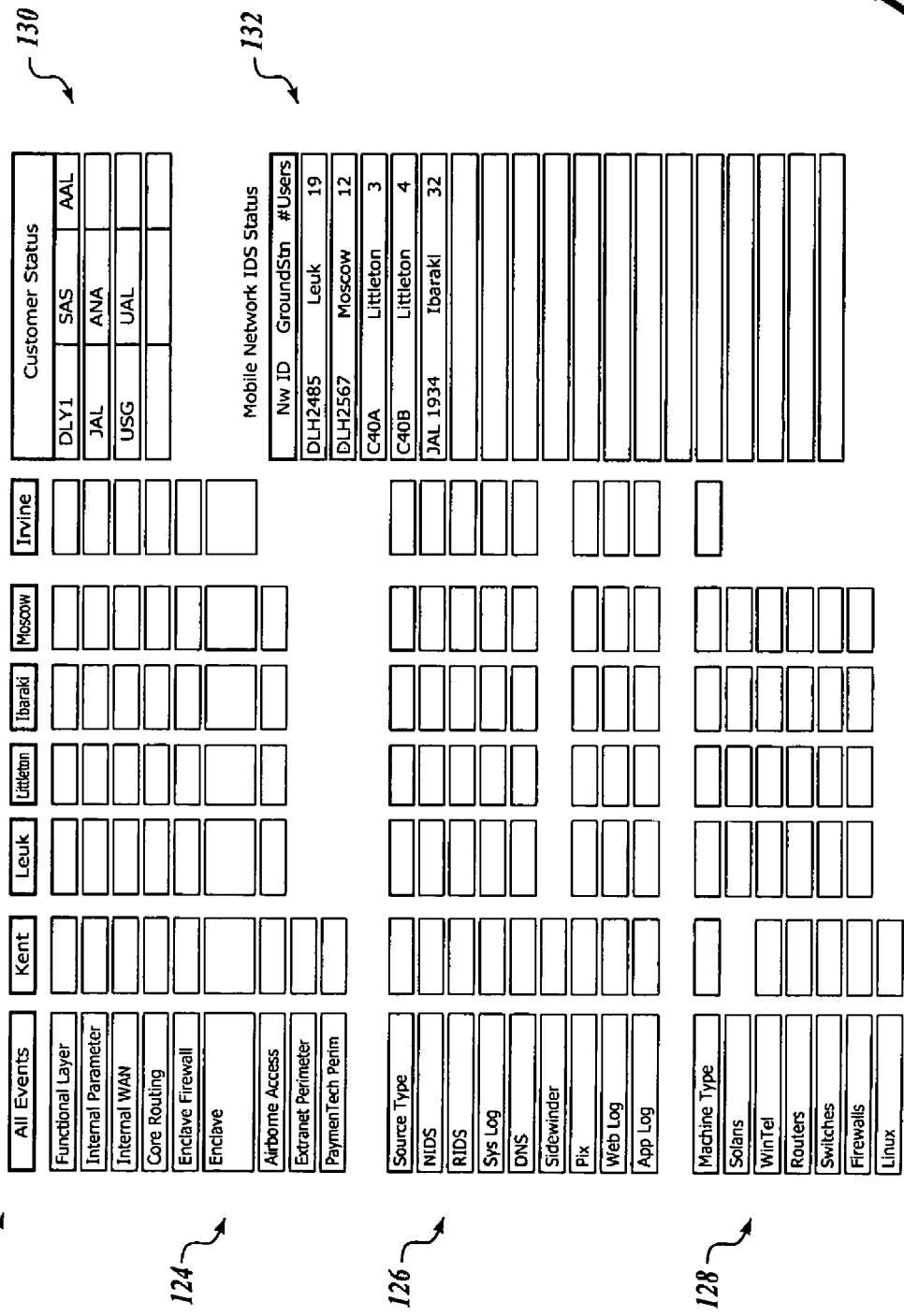
FIG. 9 illustrates an exemplary mobile network security management display.

Referring additionally now to FIG. 9, an exemplary display 120 may be presented to an operator or analyst at the network operation center 16 (FIGS. 1 and 3). The display 120 suitably uses the colors described above in Table 1 to convey security status information. A display area 122 provides security status information by ground station within the communications network 10. Each column in the display area 122 suitably represents a different ground station. A first group of rows 124 provides status for functional layers, such as Internet perimeter, internal wide-area-network, core routing, and the like, at each ground station. A second group of rows 126 provides status for source type, such as Network IDS (NIDS), Host-based IDS (HIDS), system log, DNS, and the like, at each ground station. A third group of rows 128 provides status for machine types, such as Solaris, WinTel, routers, switches, and the like, at each ground station. A display area 130 provides an indication of status (by color code as described above) for customers that subscribe to the communications network 10. A display area 132 provides an aggregate display of all the display objects 102 (FIG. 8), as described above, for the mobile platforms that are connected to the mobile communications network 10. As a result, operators may focus their efforts on the more severe security issues that may exist within the mobile communications network, thereby permitting security "triage" measures to be performed.

Now that an exemplary mobile communications network and an exemplary security management architecture have been explained, an exemplary method according to an embodiment of the present invention will be set forth below.

Exemplary Method

Referring now to FIGS. 10A through 10F, an exemplary method is set forth for managing security of the mobile network 10 (FIGS. 1 and 3). A routine 200 (FIGS. 10A-10C) is performed onboard the mobile platform 10 and a routine 300 (FIGS. 10D-10F) is performed at the network operation center 16.

The routine 200 starts at a block 210. At a block 212, the IDS functionality 34 (FIG. 2) detects a security event. At a block 214, classification and severity priority is assigned to the event. At a block 216, the IDS functionality 34 causes the security event information to be written to a log. At a block 217, the security event information is captured by the security status agent 35 using the buffer 84 as described above.

At a block 218, a security state vector is generated. At a block 220, the total number of security events detected since startup is incremented. Additionally, the number of critical, major, and minor security events is tallied in 8 bit rollover counters.

The highest detected security event classification in the buffer is determined at a block 224. The second highest detected security event classification in the buffer is determined at a block 226. The third highest detected security event classification in the buffer is determined at a block 228. The security state vector is formatted at a block 230. It will be appreciated that the blocks 224, 226, and 228 suitably are performed as described above in the context of generating the top three stack 92 from the contents of the buffer 84 (FIGS. 6A and 6B).

At a block 232 the security state vector is stored by the mobile platform management agent 36. At a decision block 236 a determination is made whether or not a predetermined time period has expired. Given by way of non-limiting example, in one exemplary embodiment of the present invention a time period of around five minutes or so may be used. However, it will be appreciated that any time period may be used as desired for a particular application. If the predetermined time period has not expired, then the routine 200 ends at a block 239.

If a determination is made at the decision block 236 that the predetermined time period has expired, then at a block 238 the message 70 (containing the most current security state vector) is transmitted. The mobile platform management agent 36 causes the message 70 to be communicated from the server 30 (FIG. 2) to the DTR 22 (FIG. 2). The message 70 is communicated to the transmitter 24 (FIG. 2) and is transmitted via the antenna(s) (not shown) to the satellite 20a or 20b (FIGS. 1 and 3) and the ground station 18a or 18b (FIGS. 1 and 3), respectively. The routine 200 then ends at the block 239.

Figure 10A:
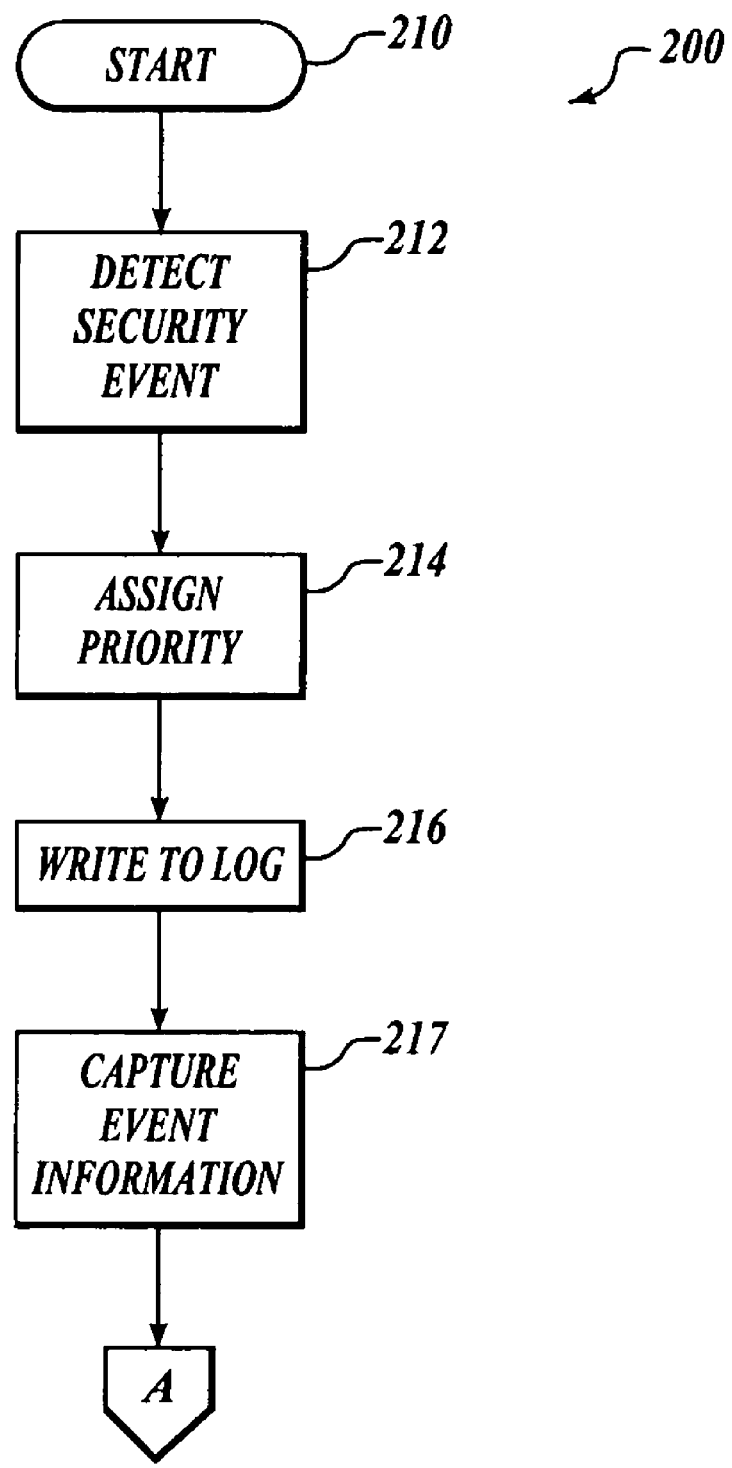
FIGS. 10A through 10F are flowcharts of an exemplary method according to an embodiment of the present invention.
Figure 10B:
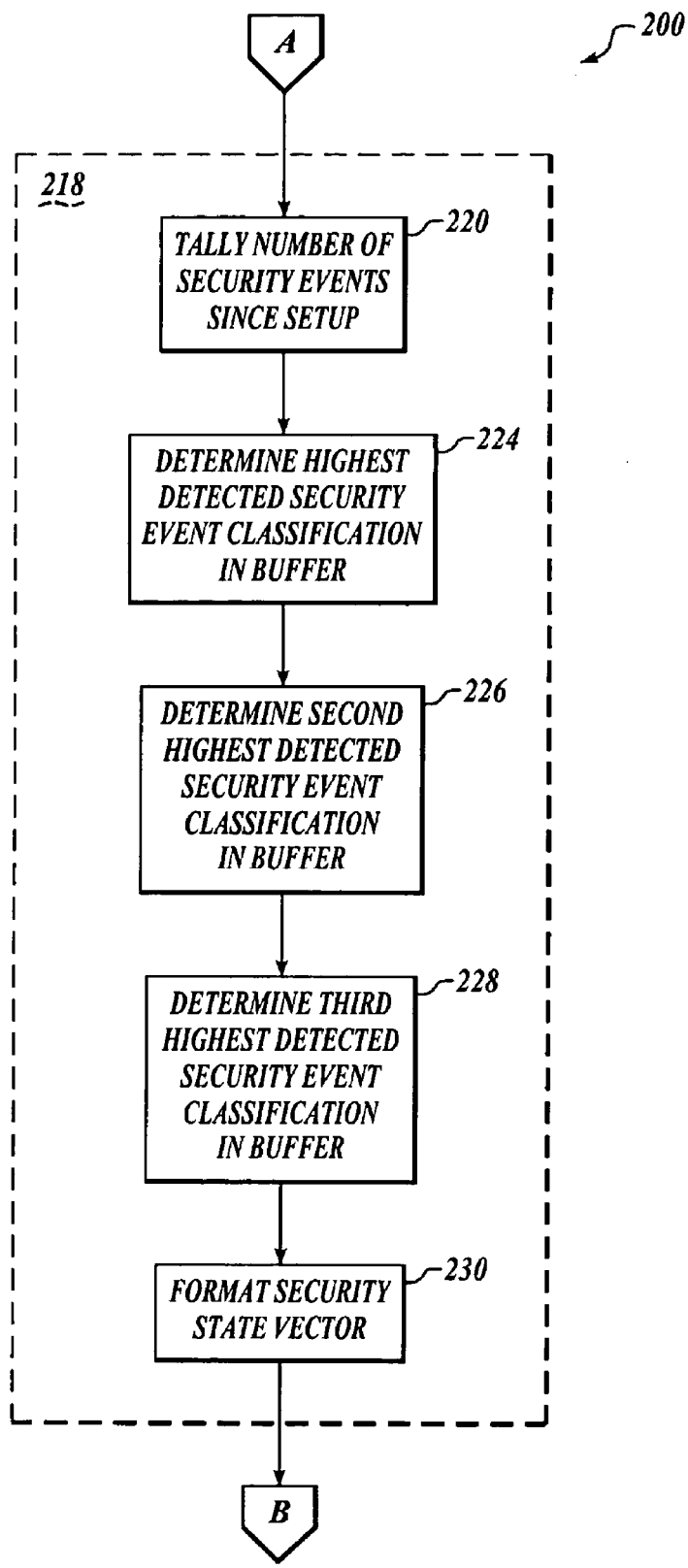
Figure 10C:
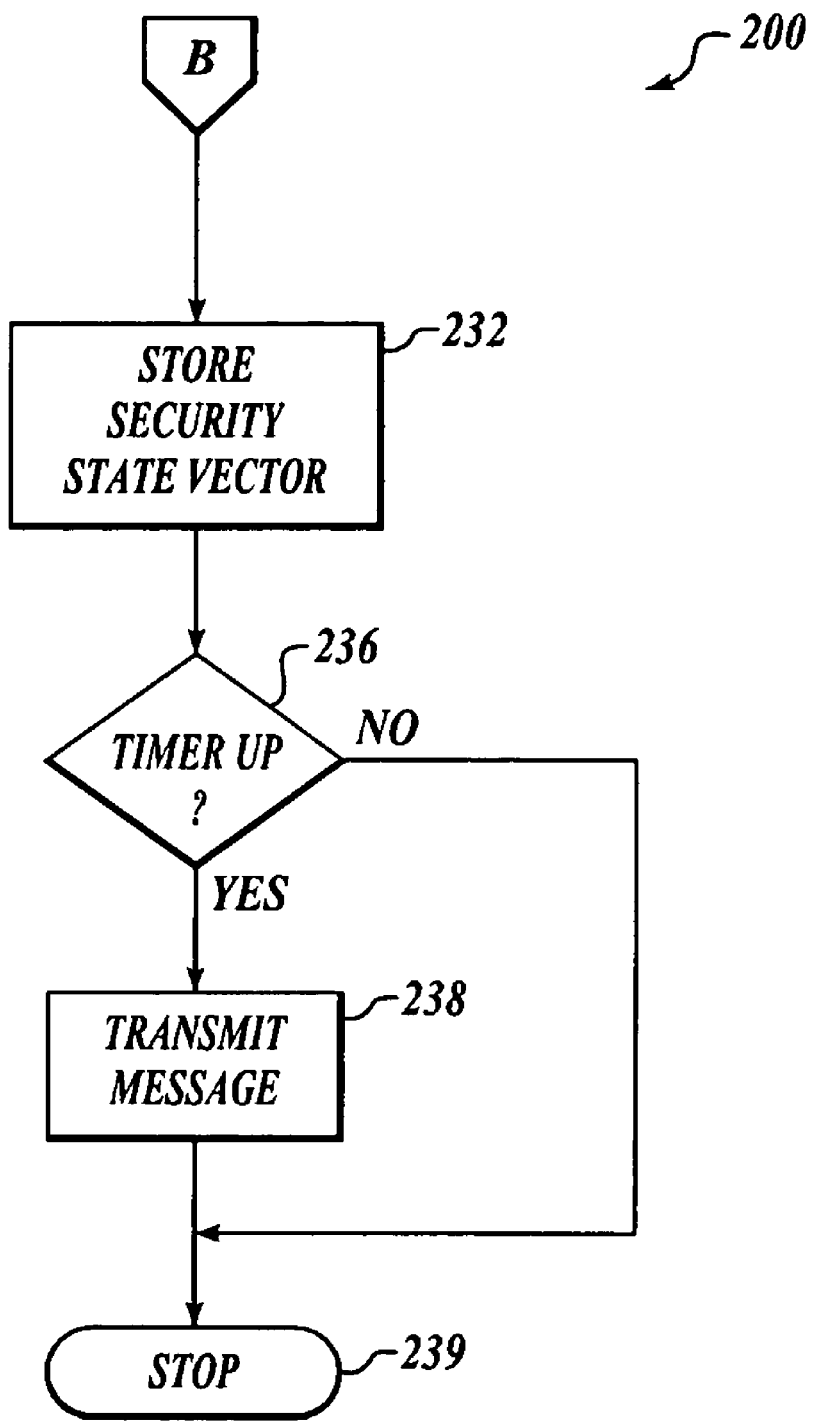
Figure 10D:
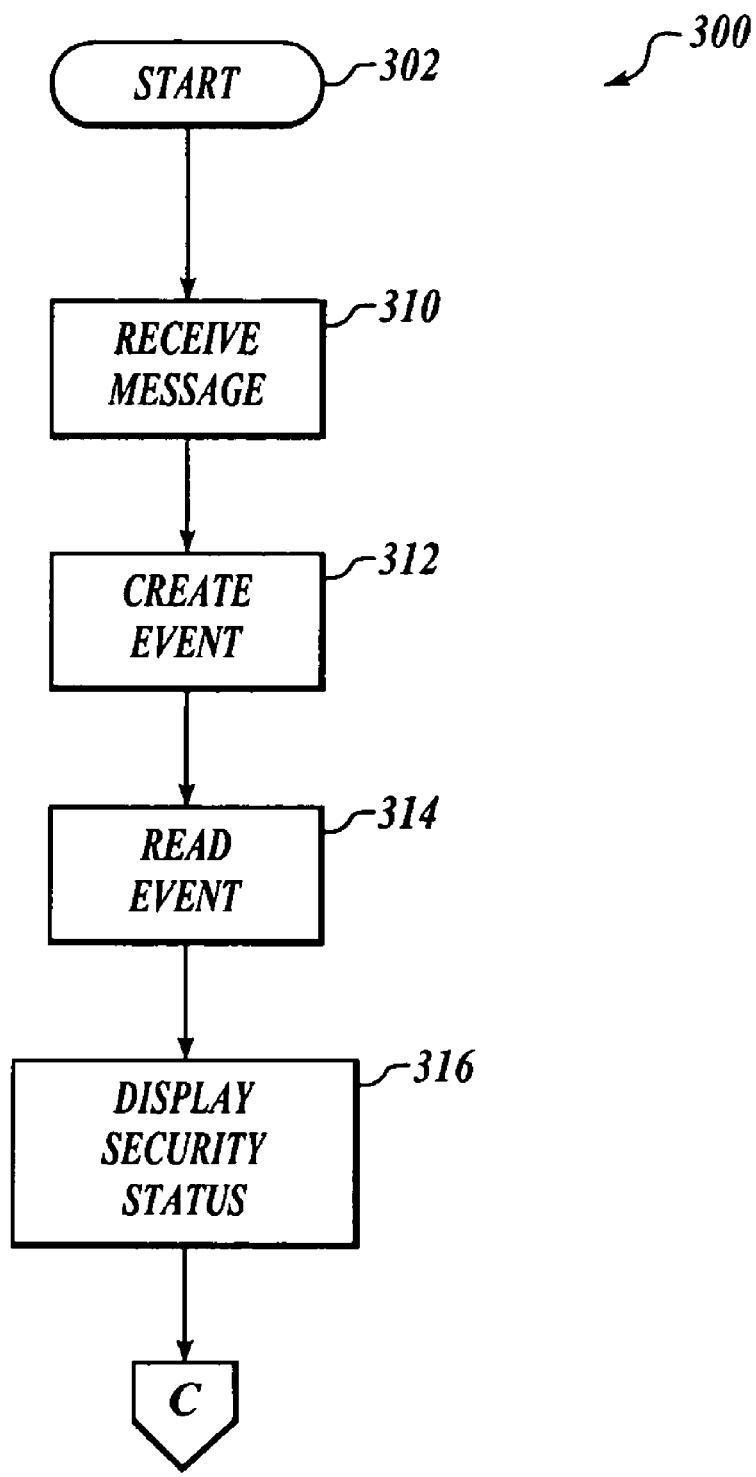
Figure 10E:
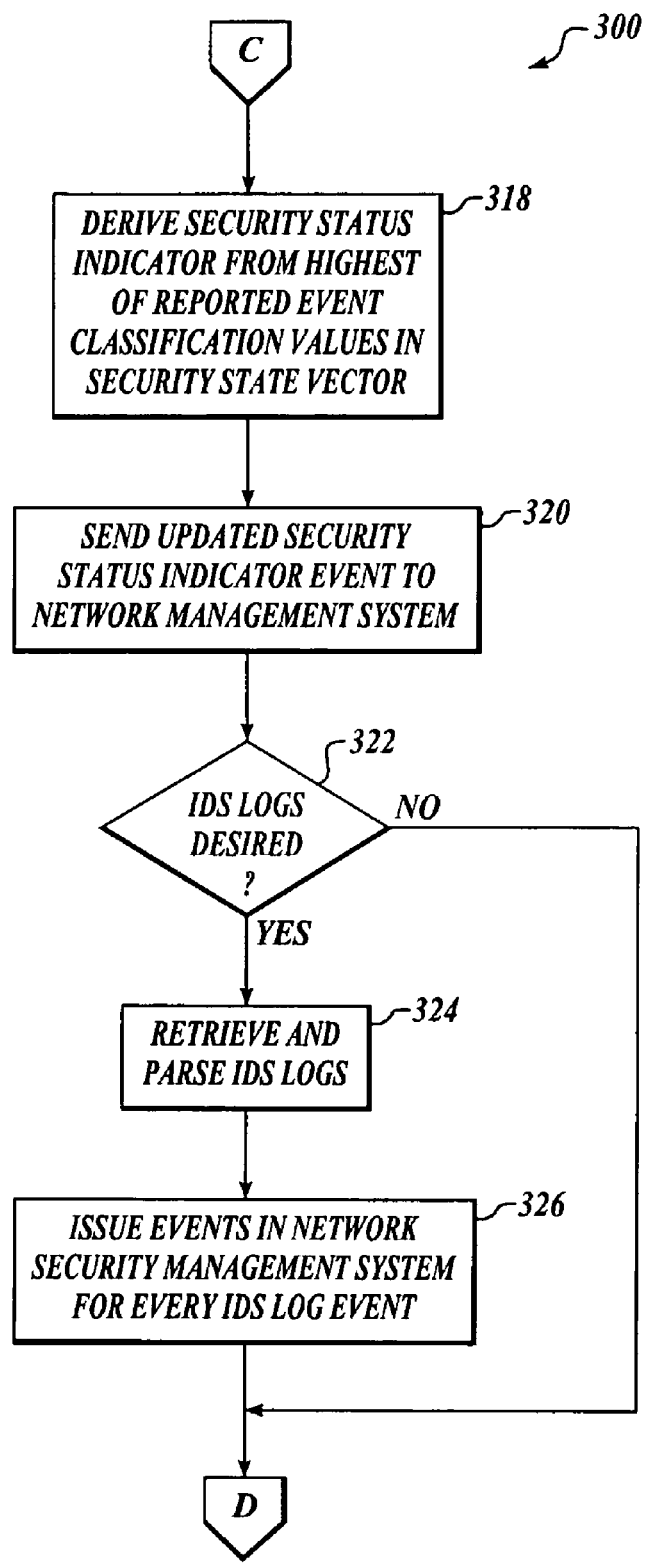
Figure 10F:
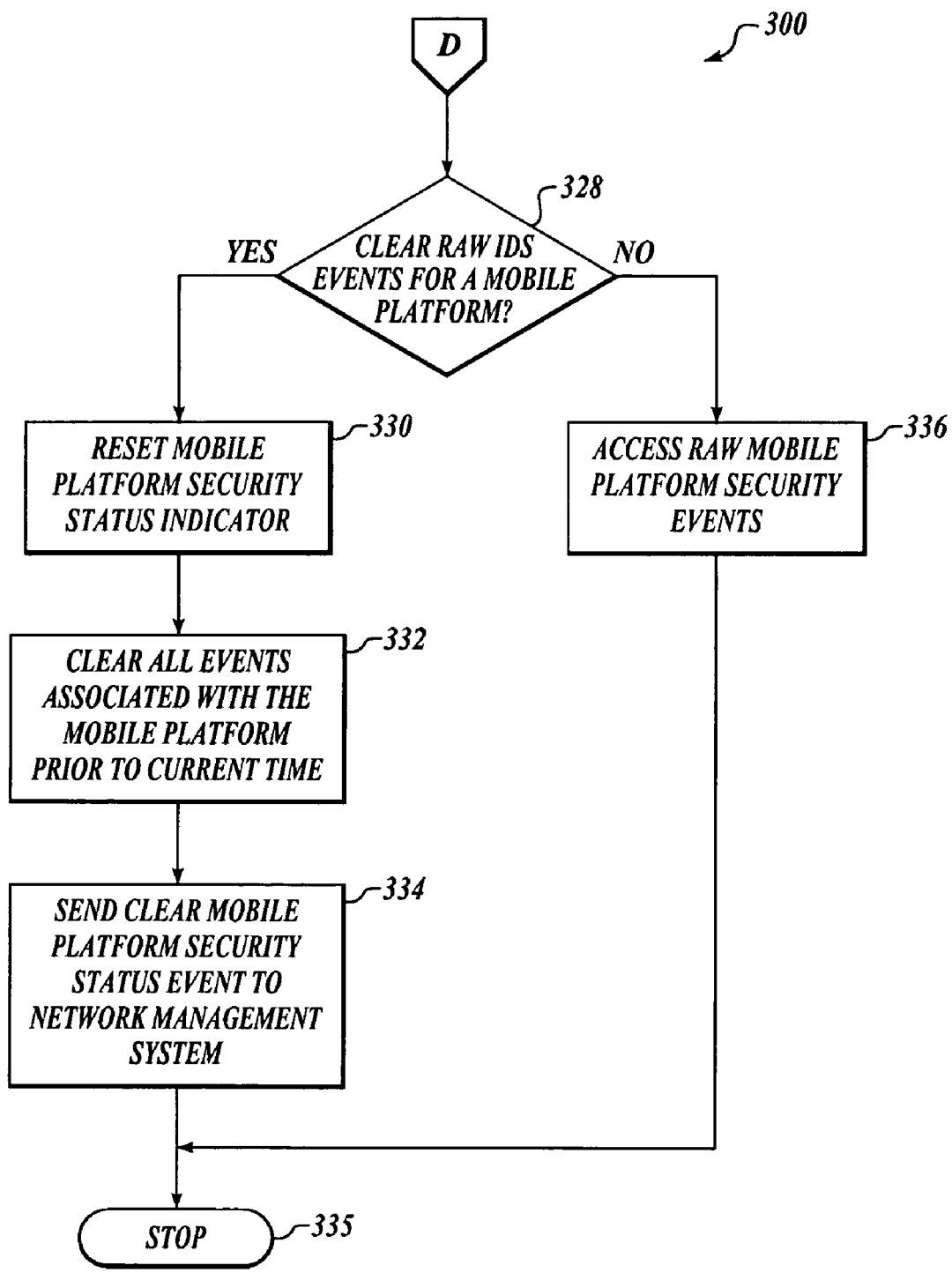

Referring now to FIGS. 10D-10F, the routine 300 is performed by the network management system 42, the network security management system 43, and the operators thereof in the network operation center 16. The routine 300 starts at a block 302. At a block 310, the message 70 is received via the satellite 20a or 20b, the GRTS communications device 38a or 38b (FIG. 3), and the message server 44a or 44b (FIG. 3), respectively, by the network security management system 43 in the network operation center 16.

At a block 312 the network security management system 43 creates events from the message 70. At a block 314, the network management system 42 reads the event, and causes the event to be displayed at a block 316. At a block 318, the network security management system 43 derives a security status indicator, such as a suitable color as described above, from the highest of the reported event classification values in the security state vector. At a block 320 an updated security status indicator event is sent to the network management system 42.

At a decision block 322, a determination is made whether or not logs from the IDS functionality 34 are desired. If so, then at a block 324 the IDS logs are retrieved from the mobile platform and are parsed. At a block 326 the network security management system 43 issues events for every IDS log event.

The routine 300 then proceeds to a decision block 328. The routine 300 also proceeds to the decision block 328 when a determination is made at the decision block 322 that IDS logs are not desired. At the decision block 328 a determination is made whether or not it is desired to clear raw IDS events for a mobile platform. In one exemplary embodiment, the criteria for whether to retrieve the logs (or later, after possibly reviewing the logs, to clear the events) is operationally determined by the severity of the detected security events, the number and frequency of the detected security events, and the relative frequency distribution of events across the mobile network. Advantageously, a minimal number of operators quickly can triage an entire fleet of mobile network elements and focus their critical time resources on the most operationally relevant elements at the time. To this end, it will be appreciated that the display status 104 (FIG. 8) indicates the number of users potentially affected by a security incident.

If a determination is made at the decision block 328 to clear the raw IDS events for the mobile platform, then at a block 330 the mobile platform security status indicator is reset to a severity of "clear" (suitably indicated by a color code of green). At a block 332 all events associated with the mobile platform (prior to the current time) are cleared. At a block 334, a "clear mobile platform security" status event is sent to the network management system 42. The routine 300 then ends at a block 335.

If a determination is made at the decision block 328 that raw IDS events for a mobile platform are not to be cleared, then at a block 336 an operator or analyst can access raw mobile platform security events via the logs retrieved at the block 324. Advantageously, high severity security events suitably may be at the top of the list. The routine 300 then ends at the block 335.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for communicating state of security in a mobile communications network, the method comprising:
    generating data regarding a plurality of security events detected during a period of time onboard at least one mobile platform in a mobile communications network;
    processing the data, wherein processing the data includes:
        assigning event classifications to one or more of the plurality of security events, wherein an event classification of a particular security event of the plurality of security events is associated with a type of the particular security event;
        assigning event priorities of one or more of the plurality of security events, wherein an event priority of the particular security event of the plurality of security events is indicative of a level of severity of the particular security event;
        determining a first number indicating how many of the plurality of security events were assigned a first event priority;
        determining a second number indicating an aggregate total count of the plurality of security events;
        determining an event classification of a most severe security event of the plurality of security events based on the assigned event priorities and the assigned event classifications;
        determining a second event classification of a second most severe security event detected during the period of time; and
        determining a third event classification of a third most severe security event detected during the period of time;
    generating a message that includes the first number, the second number, the event classification of the most severe security event, the second event classification, and the third event classification; and
    transmitting the message.

2. The method of claim 1, further comprising:
    outputting intrusion data from an intrusion detection system; and
    writing the intrusion data to a log.

3. The method of claim 1, further comprising displaying, at a network management system, security status of the at least one mobile platform based on the message.

4. The method of claim 3, further comprising:
    deriving a security status indicator based on at least a portion of the message;
    sending a security status indicator event to the network management system; and
    issuing events in a network security management system for every intrusion detection event logged.

5. The method of claim 4, further comprising at least one of accessing and clearing mobile platform security events.

6. The method of claim 1, wherein determining the second number comprises summing the first number and a third number, wherein the third number indicates how many security events were assigned a second event priority.

7. The method of claim 6, wherein the message does not include a data field that species the third number.

8. The method of claim 1, wherein the message includes a sixty-four bit security state vector that includes the first number, the second number, the event classification, the second event classification, and the third event classification.

9. A system for communicating state of security in a mobile communications network, the system comprising:
    a server onboard a mobile platform in a mobile communications network, the server including:
        a first component configured to generate data regarding a plurality of security events detected during a period of time onboard the mobile platform;
        a second component configured to process the data, wherein the second component is further configured to:
            assign event classifications to one or more of the plurality of security events, wherein an event classification of a particular security event of the plurality of security events is associated with a type of the particular security event;
            assign event priorities to one or more of the plurality of security events, wherein an event priority of the particular security event of the plurality of security events is indicative of a level of severity of the particular security event;
            determine a first number indicating how many of the plurality of security events were assigned a first event priority;
            determine a second number indicating an aggregate total count of the plurality of security events;
            determine an event classification of a most severe security event of the plurality of security events based on the assigned event priorities and the assigned event classifications;
            determine a second event classification of a second most severe security event detected during the period of time; and determine a third event classification of a third most severe security event detected during the period of time;

a third component configured to generate a message that includes the first number, the second number, the event classification of the most severe security event, the second event classification, and the third event classification; and a transmitter configured to transmit the message.

10. The system of claim 9, further comprising an intrusion detection system configured to output intrusion data and write the intrusion data to a log.

11. The system of claim 9, wherein the server further includes a fourth component configured to periodically communicate the message to the transmitter.

12. The system of claim 9, further comprising a network management system including a display device configured to display, at the network management system, security status of the mobile platform based on the message.

13. The system of claim 12, wherein the network management system further includes:
   a fifth component configured to derive a security status indicator from at least a portion of the message;
   a sixth component configured to send a security status indicator event;
   a seventh component configured to retrieve a log of security events from at least one mobile platform based on relative severity of security events reported on the at least one mobile platform; and
   an eighth component configured to issue events for every intrusion detection event logged.

14. The system of claim 13, wherein the network management system further includes a ninth component configured to at least one of access and clear raw mobile platform security events.

15. A system comprising:
   a vehicle;
   a server onboard a mobile platform in a mobile communications network, the server including:
      a first component configured to generate data regarding a plurality of security events detected during a period of time onboard the mobile platform;
      a second component configured to process the data, wherein the second component is further confirmed to:
         assign event classifications to one or more of the plurality of security events, wherein an event classification of a particular security event of the plurality of security events is associated with a type of the particular security event;
         assign event priorities to one or more of the plurality of security events, wherein an event priority of the particular security event of the plurality of security events is indicative of a level of severity of the particular security event;
         determine a first number indicating how many of the plurality of security events were assigned a first event priority;
         determine a second number indicating an aggregate total count of the plurality of security events;
         determine an event classification of a most severe security event of the plurality of security events based on the assigned event priorities and the assigned event classifications;
         determine a second event classification of a second most severe security event detected during the period of time; and
         determine a third event classification of a third most severe security event detected during the period of time;
      a third component configured to generate a message that includes the first number, the second number, the event classification of the most severe security event, the second event classification, and the third event classification; and
      a transmitter configured to transmit the message.

16. The system of claim 15, further comprising an intrusion detection system configured to output intrusion data and write the intrusion data to a log.

17. The system of claim 15, wherein the server further includes a fourth component configured to periodically communicate the message to the transmitter.

18. The system of claim 15, wherein the vehicle includes at least one of an airplane, a maritime vessel, and a land vehicle.

19. A method for communicating state of security in a mobile communications network, the method comprising:
   receiving a message at a network operations center from a mobile platform via a mobile communications network, the message including information descriptive of a plurality of security events detected onboard the mobile platform during a period of time, wherein the message includes a first number, a second number, an event classification of a most severe security event detected during the period of time, a second event classification of a second most severe security event detected during the period of time, and a third event classification of a third most severe security event detected during the period of time, wherein:
      the first number indicates how many of the plurality of security events are assigned a first event priority, wherein the first event priority is indicative of a level of severity of corresponding security events;
      the second number indicates an aggregate total count of the plurality of security events detected during the period of time; and
      the event classification of the most severe security event of the plurality of security events is determined based on event priorities assigned to the plurality of security events and based on event classifications assigned to the plurality of security events;
   deriving security status of the mobile platform from the message; and
   displaying the derived security status.

20. A system for communicating state of security in a mobile communications network, the system comprising:
   a first subsystem disposed onboard a mobile platform in a mobile communications system, the first subsystem including:
      a server onboard the mobile platform, the server including:
         a first component configured to generate data regarding severity of a plurality of security events detected during a period of time onboard the mobile platform;
         a second component configured to process the data, wherein the second component is further configured to:
            assign event classifications to one or more of the plurality of security events, wherein an event classification of a particular security event of the plurality of security events is associated with a type of the particular security event;
            assign event priorities to one or more of the plurality of security events, wherein an event priority of the particular security event of the plurality of security events is indicative of a level of severity of the particular security event;

determine a first number indicating how many of the plurality of security events were assigned a first event priority;

determine a second number indicating an aggregate total count of the plurality of security events;

determine an event classification of a most severe security event of the plurality of security events based on the assigned event priorities and the assigned event classifications;

determine a second event classification of a second most severe security event detected during the period of time; and determine a third event classification of a third most severe security event detected during the period of time;

a third component configured to generate a message that includes the first number, the second number, the event classification of the most severe security event, the second event classification, and the third event classification; and a transmitter configured to transmit the message; and a second subsystem disposed at a network operations center, the second subsystem including:

a receiver configured to receive the message;

a processor configured to derive security status of the mobile platform from the message; and a display device configured to display the derived security status.

* * * * *